United States Patent Office 3,250,651
Patented May 10, 1966

3,250,651
POLYETHYLENEHYDRAZINE PROPELLANT COMPOSITIONS AND PREPARATION THEREOF
Robert C. Bell, Norwalk, and Robert G. Haldeman, South Norwalk, Conn., assignors to American Cyanamid Company, Stamford, Conn., a corporation of Maine
No Drawing. Filed Sept. 14, 1962, Ser. No. 224,887
9 Claims. (Cl. 149—19)

This invention relates to a propellant composition, and more particularly, to a solid composition suitable for use as a rocket propellant and to a process for making such a solid propellant.

For the propulsion of rockets, many fuel-oxidizer propellant systems are known. The principal propellants in use may be classified broadly into two classes, viz., liquid propellants and solid propellants. The present invention relates to a new and improved solid propellant and a method of making it.

In general, solid propellants comprise an intimate mixture of fuel and oxidizer, with or without additional additives for special purposes, in the form of one or more solid grains. There are many properties which are considered important and desirable for a propellant composition to be useful for rocket propulsion. Among these properties may be mentioned the following: a high specific impulse, a high and predictable burning rate, physical and chemical properties sufficient to permit storage without deformation of grain shape or deterioration of the propellant, and ease of manufacture, particularly such as to permit a highly homogenous grain to be produced.

The present invention relates to a new composition of matter which is extremely useful as a propellant by virtue of its meeting the above criteria in a manner which is satisfactory and being superior to most operational solid propellants in having a significantly higher linear burning rate. A high linear burning rate makes for a shorter time for delivery of the power in a propellant grain of a given size and configuration. This means that a high thrust is produced initially giving, to a rocket which it may be powering, a high acceleration to permit the attainment of high speeds rapidly.

In accordance with this invention, the novel propellant mainly comprises oxygen-supplying oxidizer particles dispersed in a rubbery matrix of polyethylenehydrazine. Polyethylenehydrazine is a polymer which may be considered as comprising a plurality of recurring

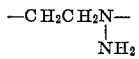

units.

This composition is preferably prepared by mixing particles of polyethylenehydrazine with particles of an oxygen-supplying oxidizer and compressing the thus formed mixture at a suitable temperature and pressure for sufficient time to convert the loose mixture of particles into a unitary rubbery solid mass wherein the solid oxidizer particles are uniformly dispersed in the rubbery polyethylenehydrazine matrix.

Additionally, because of the high nitrogen content of polyethylene hydrazine, a higher ratio of fuel to oxidizer can be utilized than is conventional with non-nitrogen containing fuels. The principal advantage of this resides in the fact that the fuel acts as a binder, and stoichiometric proportions of fuel (binder) to oxidizer usually result in such a low proportion of fuel as to make formation of a satisfactorily strong matrix of binder difficult, if not impossible. With the lower concentration of oxidizer used with the present composition, more fuel (binder) can be employed making a stronger, more uniform matrix thereof relatively simpler to attain.

In order to provide a better understanding of this invention, reference may be had to the following examples, the details of which are to be taken as illustrative only and not as limiting the invention except insofar as such limitations may appear in the subjoined claims.

Example 1

A mixture of two moles of polethylenehydrazine ground to minus 20 mesh and one mole of ammonium perchlorate was placed in a suitable mold and compressed for about one-half hour at 60° C. to 100° C. under 100 to 300 lbs./sq. in. pressure. Under these conditions, the polyethylenehydrazine, being thermoplastic in nature, softened and flowed sufficiently to enfold the dispersed solid ammonium perchlorate particles and to convert the originally loose and free flowing mixture into a single rubbery solid mass.

In place of the ammonium perchlorate utilized in the above example, numerous other oxidizers in the appropriate molar ratio to fuel could be used, such as sodium perchlorate, lithium perchlorate, potassium perchlorate, magnesium perchlorate, hydrazine perchlorate, potassium nitrate, sodium nitrate, ammonium nitrate, lithium nitrate, hydrazine nitrate, sodium chlorate, etc. Depending upon various conditions of use, the ratio of oxidizer to fuel (polyethylenehydrazine) may be selected to provide stoichiometric, excess, or insufficient oxygen for oxidation of the carbon and hydrogen in the propellant system. Thus, for example, one might use as little as 10% oxidizer or as much as 85% oxidizer or intermediate concentrations of oxidizer.

Example 2

The process of preparing the propellant of Example 1 was followed to produce the unitary rubbery solid mass. This mass was ground to minus 20 mesh and recompressed under the same conditions as the original compression in order to improve the uniformity of dispersion of the ammonium perchlorate crystals in the rubbery polyethylenehydrazine matrix.

This propellant had a linear burning rate of 1.26 in./sec. at 1000 lbs. sq. in. and 70° F. (as compared with a burning rate of about 0.3 to 0.5 in./sec. for many operational solid propellants) and a pressure exponent of 0.578 over the pressure range 500 lbs./sq. in. to 2000 lbs./sq. in. The tensile strength was 114 lbs./sq. in., the maximum strain was 45.8% and the modulus of elasticity was 976 lbs./sq. in. The density was 1.49 gm./cc. The impact sensitivity or "zero point" determined with a drop tester using a 2 kg. weight was 40 cm. The auto ignition temperature was 230° C. and the electrostatic discharge sensitivity was 0.013 joule. The theoretical specific impulse was 235 lb.$_{(f)}$-sec./lb.$_{(m)}$.

Example 3

By the procedure of Example 2, an aluminum-containing composition was prepared comprising 28.7% polyethylenehydrazine, 58% ammonium perchlorate, and 13.3% aluminum by weight. This composition had a linear burning rate of 1.08 in./sec. at 1000 lbs./sq. in. and a pressure exponent of 0.958 over the range of pressures from 700 lbs./sq. in. to 2000 lbs./sq. in.

In addition to or in place of the aluminum in the aforesaid composition, other metals useful as fuels, such as magnesium, zirconium, hafnium, beryllium, boron, titanium, and the like may be incorporated. Such metals serve to raise the flame temperature of the propellant thereby increasing the specific impulse.

In such a composition, comprising polyethylenehydrazine, oxidizer, and metal, the ratio of oxidizer to fuels (polyethylenehydrazine plus metal) may be selected to provide stoichiometric, excess, or insufficient oxygen for oxidation of the carbon, hydrogen, and metal in the propellant system. Thus, for example, one might use as little as 10% oxidizer or as much as 85% oxidizer or intermediate concentrations thereof.

*Example 4*

Following the procedure of Example 2, a composition of 31.4% polyethylenehydrazine, 68.5% ammonium perchorate, and 0.1% carbon black by weight was prepared. This composition had a linear burning rate of 1.30 in./sec. at 1000 lbs./sq. in. and a pressure exponent of 0.93 over the range of pressures from 500 lbs./sq. in. to 200 lbs./sq. in.

In each of the aforementioned examples, where ammonium perchlorate is mentioned as the oxidizer, any of the oxidizers given in Example 1 singly or in combination with each other may be utilized. Additionally, additives may be incorporated into the propellant as may be desired, such as binders, oxidation inhibitors or catalysts, radiation absorbers, etc., as is well known in the art.

Since the propellants formed in the aforesaid manner are easily cut or machined, they may be molded in any convenient shape and cut or machined to the desired size and/or shape or, alternatively, may be compressed in a mold which is of such a size and shape as will yield directly a grain of the configuration desired for direct use in a rocket motor case.

It is thus seen that there has been provided herein a new and improved solid propellant composition and a method for preparing such a solid propellant from its ingredients.

We claim:
1. A solid, rubbery mass of material comprising inorganic oxidizing salt particles dispersed in polyethylenehydrazizne.
2. A composition of matter as defined in claim 1 wherein said oxidizer comprises ammonium perchlorate.
3. A composition of matter as defined in claim 1 including particles of metal dispersed in said polyethylenehydrazine.
4. A composition of matter as defined in claim 3 wherein said metal is selected from the group consisting of aluminum, magnesium, zirconium, hafnium, beryllium, boron, and titanium.
5. A composition as defined in claim 1 wherein the concentration of oxidizer particles therein is such as to supply approximately the amount of oxygen needed to completely oxidize the polyethylenehydrazine.
6. A process for making a solid propellant comprising:
mixing particles of polyethylenehydrazine with particles of an inorganic oxidizing salt to form a uniform mixture thereof; and
compressing the thus-formed mixture under a pressure of from about 100 to about 300 pounds per square inch at a temperature of from about 60° C. to about 100° C. for a time sufficient to convert the loose mixture of particles into a unitary rubbery solid mass.
7. A process for making a solid propellant comprising:
mixing particles of polyethylenehydrazine with particles of an inorganic oxidizing salt to form a uniform mixture thereof;
compressing the thus formed mixture under a pressure of from about 100 to 300 pounds per square inch at a temperature of from about 60° C. to about 100° C. for a time sufficient to convert the loose mixture of particles into a unitary rubbery solid mass;
reducing said rubbery mass to small particles; and recompressing the thus formed rubbery particles under a pressure of from about 100 to about 300 pounds per square inch at a temperature of from about 60° C. to about 100° C. for a time sufficient to convert the loose mixture of rubbery particles into a uniform unitary rubbery solid mass.
8. A process as defined in claim 7 wherein said two compression steps are performed under substantially the same conditions.
9. A process as defined in claim 7 wherein said particles of polyethylenehydrazine have a particle size less than about 20 mesh.

References Cited by the Examiner

UNITED STATES PATENTS 3,034,936  5/1962  Matsuda et al. _____ 149—19

OTHER REFERENCES

Chem. and Ind., July 1958, p. 915.

LEON D. ROSDOL, *Primary Examiner.*

CARL D. QUARFORTH, *Examiner.*

B. R. PADGETT, *Assistant Examiner.*